(12) United States Patent
Li et al.

(10) Patent No.: US 10,764,726 B2
(45) Date of Patent: Sep. 1, 2020

(54) ELECTRONIC MESSAGING DEVICE AND ELECTRONIC MESSAGING METHOD

(71) Applicant: BOE TECHNOLOGY GROUP CO., LTD., Beijing (CN)

(72) Inventors: Weiguo Li, Beijing (CN); Tianyue Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/344,354

(22) PCT Filed: Oct. 11, 2018

(86) PCT No.: PCT/CN2018/109817
§ 371 (c)(1),
(2) Date: Apr. 23, 2019

(87) PCT Pub. No.: WO2019/072207
PCT Pub. Date: Apr. 18, 2019

(65) Prior Publication Data
US 2019/0274012 A1    Sep. 5, 2019

(30) Foreign Application Priority Data

Oct. 12, 2017  (CN) .......................... 2017 1 0948452

(51) Int. Cl.
*H04W 4/00* (2018.01)
*H04W 4/12* (2009.01)
(Continued)

(52) U.S. Cl.
CPC .............. *H04W 4/12* (2013.01); *H04W 4/16* (2013.01); *H04W 4/80* (2018.02); *H04W 12/00407* (2019.01)

(58) Field of Classification Search
CPC . H04W 76/14; H04W 88/06; H04W 12/0013; H04W 12/00503; H04W 12/02;
(Continued)

(56) References Cited

U.S. PATENT DOCUMENTS 10,299,071 B2 *  5/2019  Haney .................... H04W 4/21
2010/0081385 A1 *  4/2010  Lin ...................... H04M 1/7253
455/41.3
(Continued)

FOREIGN PATENT DOCUMENTS

CN         103874022 A      6/2014
CN         104104892 A     10/2014
(Continued)

OTHER PUBLICATIONS

1st Office Action dated Apr. 17, 2019 in CN201710948452.6.
International Search Report and Written Opinion dated Dec. 28, 2017 in PCT/CN2018/109817.

*Primary Examiner* — Joseph Arevalo
(74) *Attorney, Agent, or Firm* — Syncoda LLC; Feng Ma

(57) ABSTRACT

An electronic messaging device includes a receiving module, a processing module, and at least one of a display module or a transmitting module. The receiving module receives a message, and sends the message to the processing module. Upon detecting that a triggering condition is satisfied, the processing module sends information associated with the message to the display module and/or the transmitting module for presentation to a subject. The device can further include a communications module configured to forward contacting message and/or phone call from the subject to another subject implicated in the message, and optionally to further forward a reply message from the other subject to the subject. A user can leave a message to the device via a first user terminal, and the electronic messaging device can push the information associated with the message to the subject via a second user terminal.

16 Claims, 10 Drawing Sheets

(51) Int. Cl.
*H04W 4/80* (2018.01)
*H04W 12/00* (2009.01)
*H04W 4/16* (2009.01)

(58) Field of Classification Search
CPC ..... H04W 12/06; H04W 36/03; H04W 4/021;
H04W 4/023; H04W 4/50; H04W 64/00;
H04W 68/12; H04W 76/12
USPC ......... 455/466, 456.3, 411, 414.1, 41.2, 344,
455/3.06
See application file for complete search history.

(56) References Cited

U.S. PATENT DOCUMENTS

| | | | | |
|---|---|---|---|---|
| 2013/0211971 | A1* | 8/2013 | Lin | G06F 21/10 |
| | | | | 705/27.1 |
| 2014/0072185 | A1* | 3/2014 | Dunlap | G06K 9/00288 |
| | | | | 382/118 |
| 2014/0213190 | A1* | 7/2014 | Yamaoka | G06F 3/1204 |
| | | | | 455/41.3 |
| 2014/0294257 | A1* | 10/2014 | Tussy | G06Q 10/00 |
| | | | | 382/118 |
| 2016/0104155 | A1* | 4/2016 | McGaugh | G06Q 20/325 |
| | | | | 705/65 |
| 2017/0185052 | A1* | 6/2017 | Wang | H04L 51/00 |
| 2018/0204191 | A1* | 7/2018 | Wilson | G06Q 20/3829 |
| 2018/0204192 | A1* | 7/2018 | Whaley | G06Q 20/0658 |

FOREIGN PATENT DOCUMENTS

| | | | |
|---|---|---|---|
| CN | 105100857 A | 11/2015 | |
| CN | 204791985 U | 11/2015 | |
| WO | WO/2016/188260 | * 4/2016 | ............. H04L 12/58 |

* cited by examiner

ELECTRONIC MESSAGING DEVICE AND ELECTRONIC MESSAGING METHOD

CROSS-REFERENCE TO RELATED APPLICATION

The present application is a continuation of, and claims priority to Chinese Patent Application Nos. 201710948452.6 filed on Oct. 12, 2017, the disclosure of which is hereby incorporated by reference in its entirety.

TECHNICAL FIELD

The present disclosure relates generally to the field of communications technologies, specifically to a wireless communications technology, and more specifically to an electronic messaging device and an electronic messaging method utilizing the electronic messaging device.

BACKGROUND

At present, in certain situations where an owner of a business premise or of a vehicle is absent, usually the owner is contacted via a paper note or a message board indicating the contact information of the owner.

However, this above traditional approach for leaving a message represents a relatively simple interactive approach. In addition, the paper notes and the message board, after their use for leaving a message thereon, are generally difficult for a reuse or a recycling, which is thus not beneficial for reusing/recycling resources and for environmental protection.

SUMMARY

In a first aspect, the present disclosure provides an electronic messaging device, which can be used to present a message to a subject.

The electronic messaging device comprises a receiving module, a processing module, and at least one of a display module or a transmitting module. The receiving module is configured to receive the message, and then to send the message to the processing module. The processing module is configured, upon detecting that a first triggering condition is satisfied, to send first information associated with the message to the at least one of the display module and the transmitting module for presentation.

Herein and throughout the disclosure, the term "subject" can be referred to as a receiver of the first information associated with the message, which can be a human, an animal, or a machine (e.g. a robot) capable of receiving the first information associated with the message.

The electronic messaging device can further include a communications module, which is communicatively connected to a network, and is configured to forward either or both of a contacting message or a contacting phone call from the subject to another subject implicated the message through the network.

Herein, the communications module can be further configured to forward a reply message from the another subject to the subject. The communications module can include at least one of a WIFI module, a cellular network communications module, or an Ethernet module.

According to some embodiments, the electronic messaging device comprises a display module, and in accordance, the processing module is configured, upon detecting that a second triggering condition is satisfied, to send second information associated with the message to the display module for display to the subject.

According to some embodiments, the electronic messaging device comprises a transmitting module, and in accordance, the processing module is configured, upon detecting that a third triggering condition is satisfied, to send third information associated with the message to the transmitting module for pushing to the subject.

In the above embodiments of the electronic messaging device, any of the second information to be displayed or the third information to be pushed can be part, or all, of the first information to be presented to the subject.

According to some embodiments, the electronic messaging device comprises a transmitting module, and the receiving module and the transmitting module are integrated into a transceiver. Optionally, the transceiver is configured to work in a wireless manner, and the wireless manner can be a Bluetooth manner, an infrared manner, or preferably an NFC manner. It is noted that the transceiver can optionally work in a wired manner as well.

In the electronic messaging device disclosed herein, the receiving module can be further configured to receive configuration data, and then to send the configuration data to the processing module. In accordance, the at least one of the display module and the transmitting module can be configured to present the information in a manner in accordance to the configuration data.

The electronic messaging device can, according to some embodiments, further comprises an identification recognition module, which is configured to obtain an identification of the subject. As such, the information presented to the subject by the processing module is configured to correspond to the identification of the subject.

In a second aspect, the present disclosure further provides an electronic messaging method utilizing the electronic messaging device according to any one of the embodiments as described above.

The electronic messaging method comprises:
obtaining a message; and
presenting first information associated with the message to a subject when a first triggering condition is satisfied.

According to some embodiments, the electronic messaging method optionally further comprises:
forwarding at least one of a contacting message or a contacting phone call from the subject to another subject based on the message.

Furthermore, the electronic messaging method can optionally further comprise:
forwarding a reply message from the another subject to the subject.

Herein the another subject can be a same subject leaving the message, but can also be a different subject.

In the electronic messaging method disclosed herein, the step of presenting the first information associated with the message to a subject when the first triggering condition is satisfied can comprise at least one of:
displaying second information associated with the message to the subject if a second triggering condition is met; or
transmitting third information associated with the message for pushing to the subject if a third triggering condition is met.

According to some embodiments of the electronic messaging method, the step of obtaining a message comprises:
receiving the message and configuration data;
Correspondingly, the step of presenting the first information associated with the message to a subject when the first triggering condition is satisfied comprises:

presenting the first information to the subject in a manner in accordance to the configuration data.

According to some embodiments of the disclosure, prior to the step of presenting the first information associated with the message to a subject when the first triggering condition is satisfied, the electronic messaging method further comprises:

determining an identification of the subject;

Correspondingly, in the step of presenting the first information associated with the message to a subject when the first triggering condition is satisfied, the first information presented to the subject corresponds to the identification of the subject.

In a third aspect, the present disclosure further provides an electronic messaging system, which comprises an electronic messaging device according to any one of the embodiments as described above.

Optionally, the electronic messaging system further comprises a first user terminal, which is communicatively connected to the electronic messaging device and is configured to allow a user to leave a message thereby and further to transmit the message to the electronic messaging device.

Optionally, the electronic messaging system further comprises a second user terminal, which is communicatively connected to the electronic messaging device and is configured to receive from the electronic messaging device, and then to present to a subject, information associated with the message.

Throughout the disclosure, the term "module", and alike, is referred to as functional entity that can be implemented in in hardware or software or in a combination of hardware and software. A module implemented in software can comprise at least one processor and a memory, wherein the memory is configured to store a software program (i.e. computer codes or executable instructions), and the at least one processor is configured to perform a calculation based on the software program stored in the memory to thereby perform a task carrying out the prescribed functionality. Furthermore, the at least one processor may include one or more controllers, general processors, specialized processors, coprocessors, etc., and the at least one processor can be arranged in a parallel processing structure and/or multiprocessing structure.

Throughout the disclosure, each of a method, a step, a sub-step, and a process, etc., may be implemented as part of an operating system or a specific application, component, program, object, module, or series of instructions referred to as "programs". For example, one or more programs may be used to execute specific processes described herein. The programs typically comprise one or more instructions in various memory and storage devices in a computer system that, when read and executed by at least one processor, cause the computer system to perform operations to execute the method, the step, the sub-step, the process, and the feature, etc. Each of a method, a step, a sub-step, a process and a feature, etc., may be implemented in software, firmware, hardware (e.g., an application specific integrated circuit), or any combination thereof.

BRIEF DESCRIPTION OF THE DRAWINGS

To more clearly illustrate some of the embodiments provided in this disclosure, the following is a brief description of drawings. It is noted that the drawings in the following descriptions are only illustrative of some, but not all of, the embodiments. For those of ordinary skill in the art, other drawings of other embodiments can become apparent based on these drawings.

DETAILED DESCRIPTION

In the following, with reference to the drawings of the embodiments disclosed herein, the technical solutions of various embodiments of the present disclosure will be described in a clear and fully understandable way.

It is noted that the described embodiments are merely some but not all of the embodiments of the invention. Based on the described embodiments of the invention, those ordinarily skilled in the art can obtain other embodiment(s), which come(s) within the scope sought for protection by the invention.

In a first aspect, an electronic messaging device is disclosed.

Figure 1A:
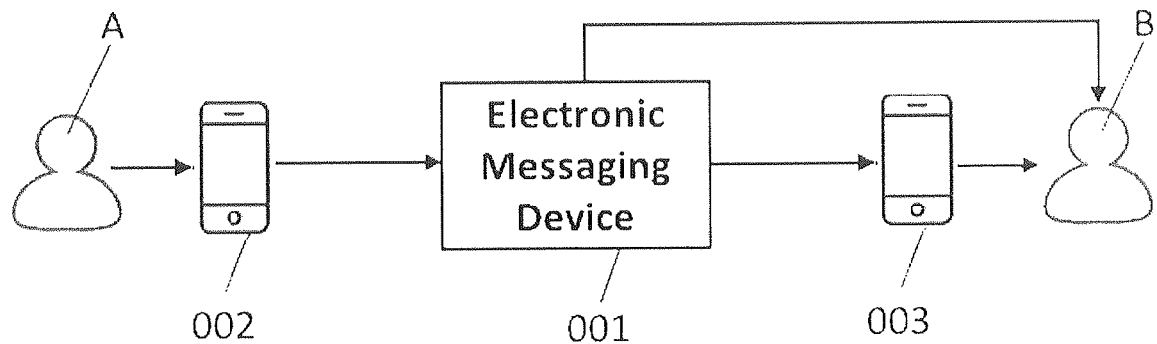
FIG. 1A illustrates an electronic messaging device in the process of presenting messages left by a first person to a second person according to some embodiments of the disclosure.

FIG. 1A illustrates an electronic messaging device in the process of presenting messages left by a message provider to a visitor according to some embodiments of the disclosure. As shown in FIG. 1A, the electronic messaging device 001 is configured to receive a message from a first person A, and then to present the message stored therein to a second person B.

Herein the first person A is substantially a message provider who leaves a message, the second person is substantially a visitor who reads the message left by the first person A, and the electronic messaging device 001 substantially provides a means for the first person A to leave a message therein and for presenting the message to the second person B.

With further reference to FIG. 1A, the electronic messaging device 001 is further configured to communicate with the first person A via a first user terminal 002. More specifically, the first person A can leave a message using the first user terminal 002, and the message is then transmitted from the first user terminal 002 to the electronic messaging device 001.

Figure 2A:
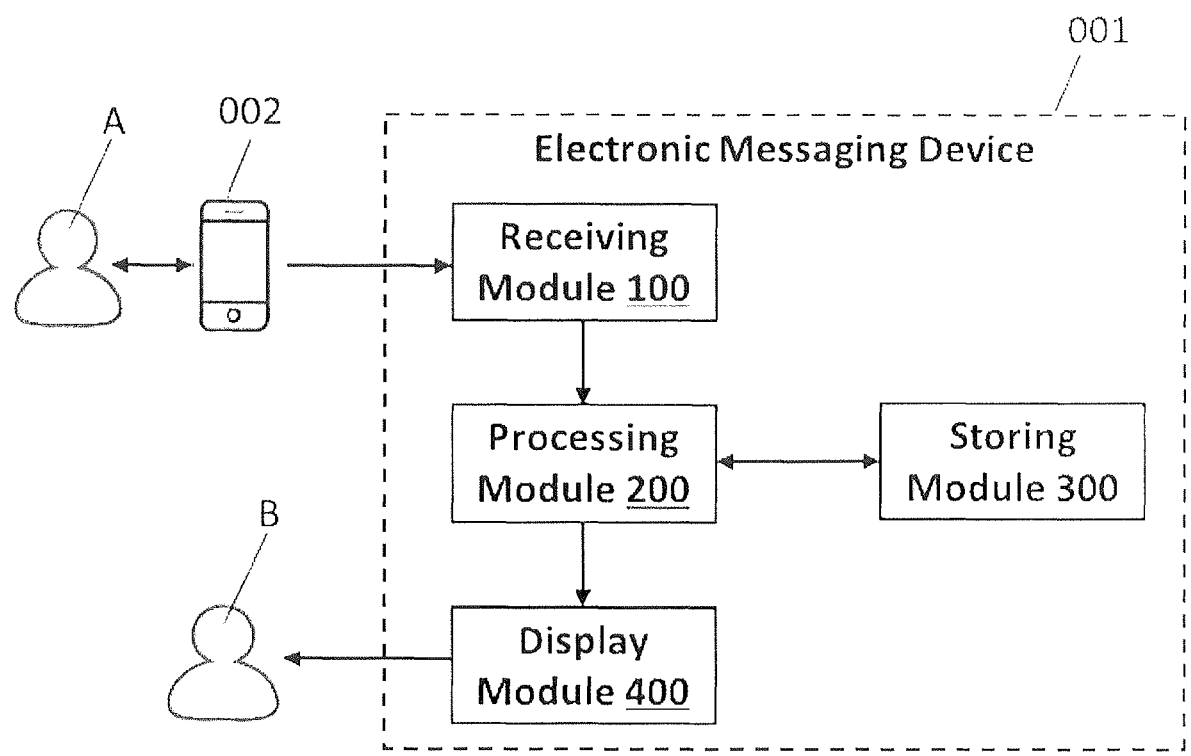
FIG. 2A illustrates a block diagram of an electronic messaging device according to some embodiments of the disclosure.
Figure 2B:
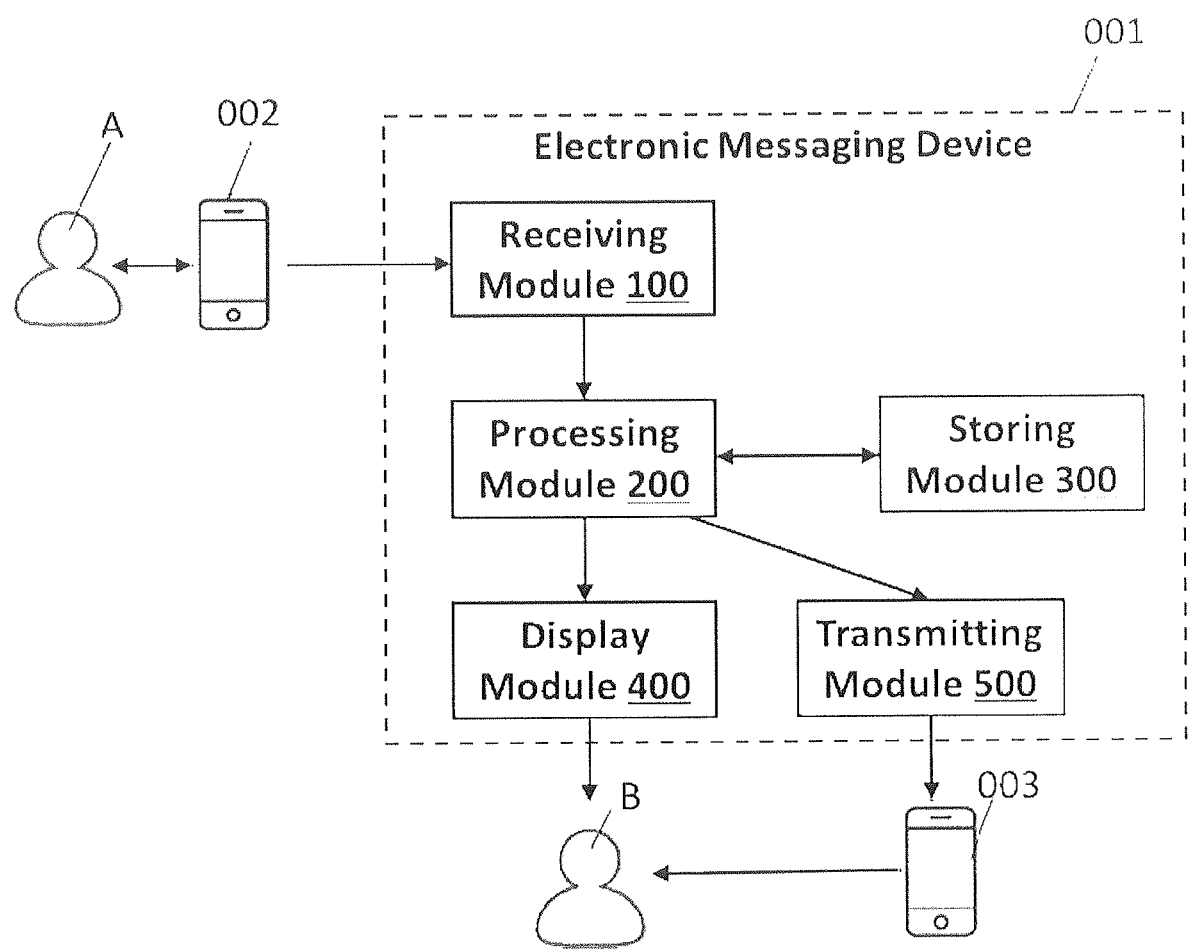
FIG. 2B illustrates a block diagram of an electronic messaging device according to yet some other embodiments of the disclosure.
Figure 2C:
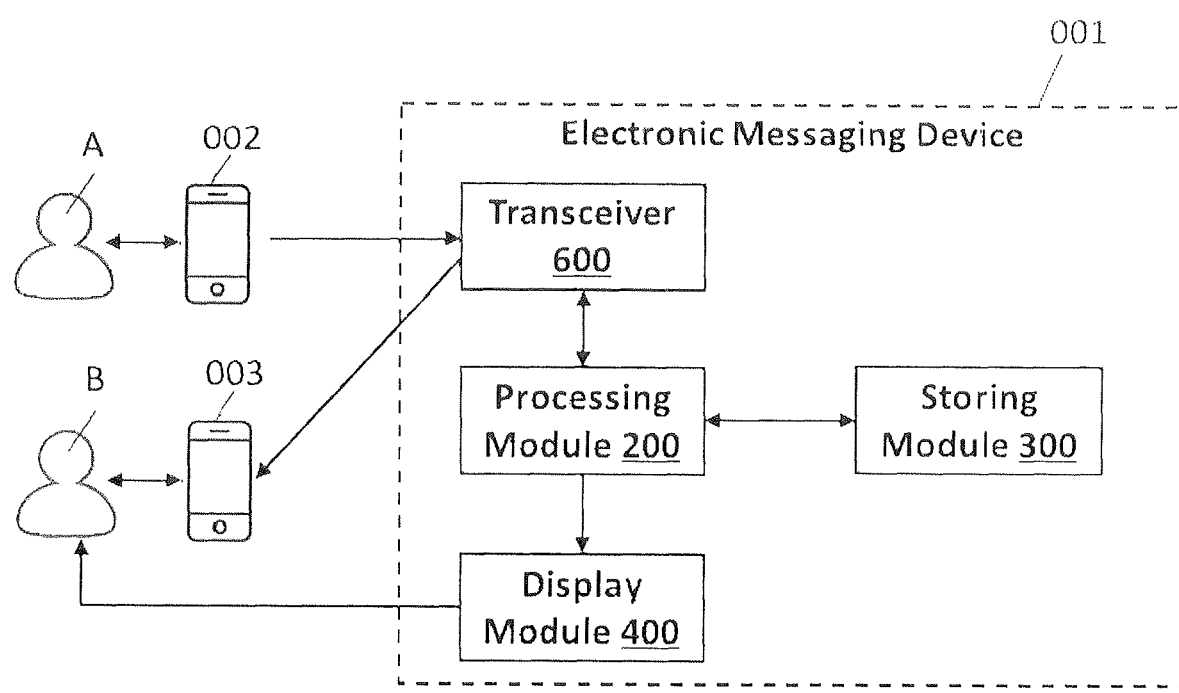
FIG. 2C illustrates a block diagram of an electronic messaging device according to yet some other embodiments of the disclosure.

The electronic messaging device 001 can be configured to present the message to the second person B in at least one of the following manner. Optionally, in a first manner, electronic messaging device 001 can directly display the message stored therein to the second person B via a display module arranged on the device (as illustrated in FIG. 2A, FIG. 2B, and FIG. 2C that follow).

Optionally, in a second manner, the electronic messaging device 001 can display a code (e.g. barcode) corresponding to the message originally left by the first person A to the second person B similarly via a display module arranged on the device, and the second person B can in turn obtain relevant information from the code, for example, by means of a second user terminal 003.

Optionally, in a third manner, the electronic messaging device 001 can transmit the message stored therein to the second person B via a second user terminal 003, which in turn allows a display of the message left by the first person A and transmitted from the electronic messaging device 001 to the second person B.

Herein, the message can comprise a text message comprising numbers and/or letters, a barcode message, a two-dimensional barcode (e.g. quick response code, or QR code), or a combination thereof. Because the message stored in, and presented by, the electronic messaging device 001 is substantially in an electrical form, the electronic messaging device 001 allows a repeated use for leaving a message. As such, compared with a traditional paper-based message board, resources can be saved using the electronic messaging device 001 disclosed herein. In addition, the electronic messaging device 001 further provides a flexibility for presenting messages from more than one first person A to more than one second person B.

In the first manner as described above, by directly displaying the message left by the first person A, the electronic messaging device 001 can provide a convenience to all visitors (including the second person B) checking the message. As such, all visitors have the access to, and can thus non-differentially check, the message without the need to bring any other devices (such as the second user terminal 003).

In the second manner as described above, by displaying a code (e.g. barcode or QR code) corresponding to the message originally left by the first person A to the second person B, the electronic messaging device 001 allows the second person B to scan the code by means of the second user terminal 003 to thereby securely obtain relevant information associated with the code, effectively preventing a risk for exposing the private information contained in the message left by the first person A, in turn leading to an improved privacy.

In the third manner as described above, the electronic messaging device 001 can transmit the message left by the first person A to the second person B via the second user terminal 003, thus the risk for privacy leakage can also be reduced. In addition, this third manner has an advantage of allowing a message having a great capacity and a complex structure to be presented to the second person B, thus leading to a better user experience.

Herein any of the first user terminal 002 and the second user terminal 003 can be a smart phone, a laptop computer, a tablet computer, or alike. Optionally, the communicative connection between any of the above two user terminals and the electronic messaging device 001 can comprise a wireless connection, which can be near field communication (NFC) connection, Bluetooth connection, or infrared connection, etc. Optionally the communicative connection between any of the above two user terminals and the electronic messaging device 001 can be a wired connection, which can be a USB/microUSB connection, a lightning connection, or alike.

Figure 1B:
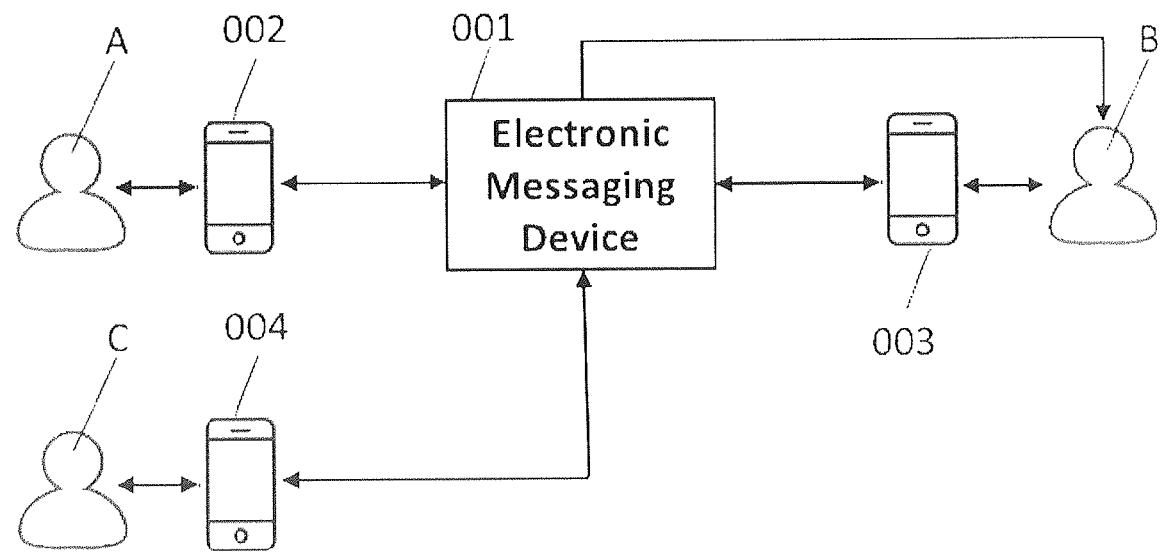
FIG. 1B illustrates an electronic messaging device in the process of presenting messages left by a first person to a second person according to some other embodiments of the disclosure.

FIG. 1B illustrates an electronic messaging device in the process of presenting messages left by a message provider to a visitor according to some other embodiments of the disclosure. As shown in FIG. 1B, in addition to the functionalities described above and illustrated in FIG. 1A (i.e. sending messages left by the first person A to the second person B, as illustrated by the rightward arrow heads in the figure), the electronic messaging device 001 is further configured to allow the second person B to send messages to the first person A thereby, as illustrated by the leftward arrow heads in the figure.

With further reference to FIG. 1B, in these embodiments of the electronic messaging device, the electronic messaging device 001 is communicatively coupled to the first user terminal 002 and the second user terminal 003 which the first person A and the second person B respectively has access to, and the electronic messaging device 001 is configured to send messages to, and receive messages from, each of the first person A and the second person B.

It is noted that in addition to the embodiments where the second person B has a two-way interaction with the first person A, according to some other embodiments of the disclosure which is also illustrated in FIG. 1B, the messages sent by the second person B can be optionally forwarded to a third person C. Herein the third person C can be a person implicated in the message (such as a contact person mentioned in the message) left by the first person A. Based on the message left by the first person A, the second person B can communicate with the third person C (i.e. contact person) in a two-way manner through the electronic messaging device 001 and a third user terminal 004.

As such, compared with the traditional message leaving and presenting approach such as the paper-based message board, the electronic messaging device 001 brings additional advantage by allowing the second person B (i.e. visitor) to be able to communicatively reach or contact a contact person such as the first person A (i.e. message provider) or the third person C (i.e. a contact person other than the message provider), and optionally the contact person can also communicatively reach or contact the second person B (i.e. visitor). As such, by means of the electronic messaging device 001, a substantially two-way interaction between the second person B and the contact person (i.e. first person A or third person C) can be established.

Herein, any of the above mentioned user terminals (i.e. the first user terminal 002, the second user terminal 003 and the third user terminal 004) can be a smart phone, a laptop computer, a tablet computer, or alike.

Herein, similar to the above mentioned embodiments of the electronic messaging device 001 illustrated in FIG. 1A, in the embodiments of the electronic messaging device 001 illustrated in FIG. 1B, the communicative connection by which the first user terminal 002 connects the electronic messaging device 001 to thereby allow the first person A to leave a message in the electronic messaging device 001 and the communicative connection by which the second user terminal 003 connects the electronic messaging device 001 to thereby allow the second person B to read the message stored in the electronic messaging device 001 can be a wired (e.g. USB, lightning, etc.) or a wireless connection (e.g. NFC, Bluetooth, infrared, etc.).

Figure 2D:
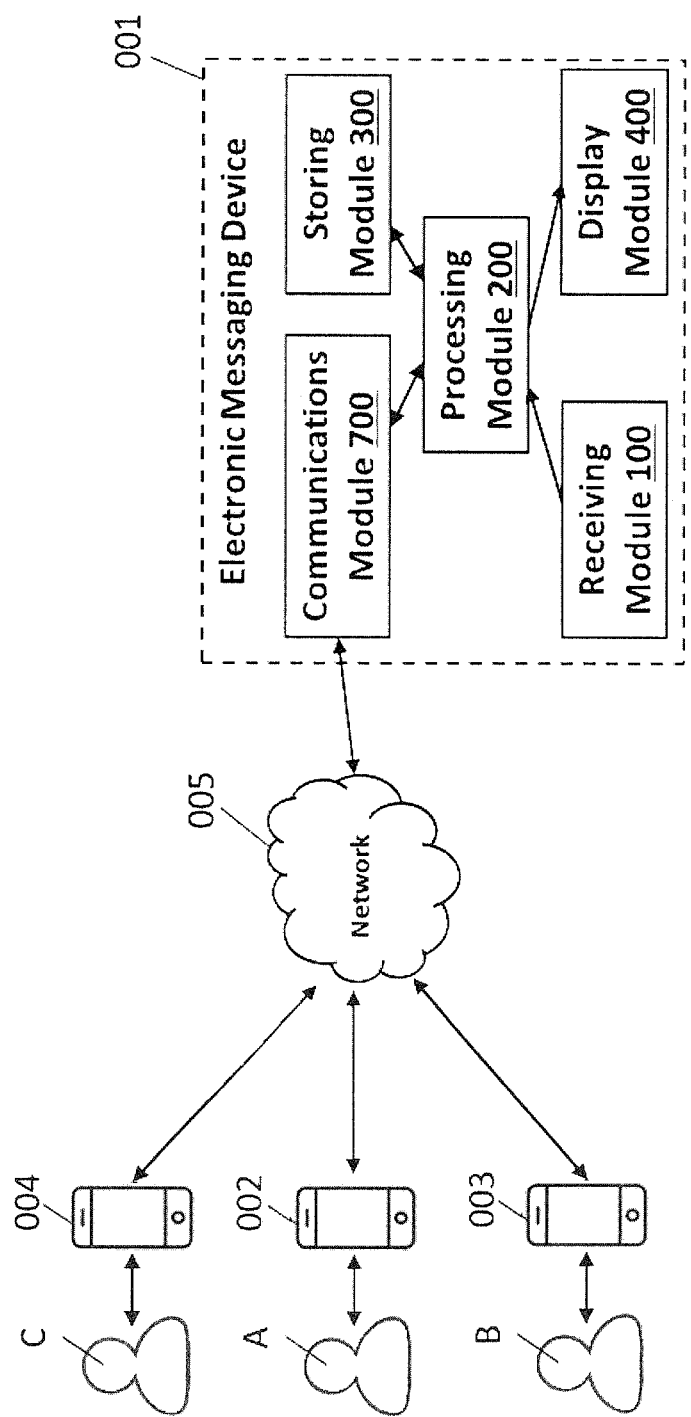
FIG. 2D illustrates a block diagram of an electronic messaging device according to yet some other embodiments of the disclosure.

Furthermore, in the embodiments of the electronic messaging device 001 illustrated in FIG. 1B, it can be configured such that the communicative connection between any of the user terminals (i.e. the first user terminal 002, the second user terminal 003 and the third user terminal 004) and the electronic messaging device 001 by which the second person B (i.e. visitor) communicatively contacts with the contact person (the first person A or the third person C) after reading the message left by the first person A (i.e. message provider) can be a wired or a wireless connection mediated through a network (e.g. internet, intranet, or cellular network, etc., which is not shown in FIG. 1B but will be illustrated in the following FIG. 2D and described in greater detail in the following section). For example, the electronic messaging device 001 can be configured to forward the message and/or the call from the visitor to the contact person or from the contact person to the visitor through a cellular network (i.e. mobile network), to thereby allow a substantially two-way communication between the visitor and the contact person.

FIG. 2A illustrates a block diagram of the electronic messaging device 001 shown in FIG. 1A and FIG. 1B according to some embodiments of the disclosure. As shown in the figure, this embodiment of the electronic messaging device 001 comprises a receiving module 100, a processing module 200, a storing module 300, and a display module 400.

The receiving module 100 is configured to receive a message that is left by the first person A (i.e. message provider) and transmitted from the first user terminal 002, and then to send the message to the processing module 200. The processing module 200 is configured to store the message sent from the receiving module 100 in a storing module 300, and upon triggering by a first triggering condition, to send the message retrieved from the storing module 300 to the display module 400. The display module 400 is configured to display the message to the second person B.

It is noted that in this embodiment of the electronic messaging device 001, the message displayed by the display module 400 can be the original message left by the first person A, but optionally, can be a processed message through a processing by the processing module 200.

Herein the first triggering condition can be that the electronic messaging device 001 starts, wakes from a sleep mode, or receives a display command, etc. In one example, the second person B can press a function button (i.e. "display button") arranged on the electronic messaging device 001 to thereby meet the first triggering condition to allow the processing module 200 to send the message to the display module 400 for display.

According to some other embodiment of the electronic messaging device 001 illustrated in FIG. 2B, in addition to the receiving module 100, the processing module 200, the storing module 300 and the display module 400, this embodiment of the electronic messaging device 001 further comprises a transmitting module 500.

In this embodiment of the electronic messaging device 001, each of the receiving module 100 and the storing module 300 can have a similar functionality as in the embodiment illustrated in FIG. 2A, whereas the processing module 200 is configured to perform at least one of the following two operations including:

(1) sending the message retrieved from the storing module 300 or a pre-stored prompt to the display module 300 for display, upon triggering by a second triggering condition; and (2) sending the message retrieved from the storing module 300 to the transmitting module 400 for transmission, upon triggering by a third triggering condition.

The display module 400 is configured, upon receiving the message or the pre-stored prompt to the display module 300 from the processing module 200, to display the message/prompt to the second person B. Herein an example of the prompt can be "please use a smart phone with an NFC functionality to read the message".

The transmitting module 500 is configured, upon receiving the message from the processing module 200, to transmit the message to the second user terminal 003 to thereby reach the second person B.

It is noted that in this embodiment of the electronic messaging device 001, the message displayed by the display module 400, or the message transmitted by the transmitting module 500 can be the original message left by the first person A, but can optionally be a processed message through a processing by the processing module 200. It is further noted that the message transmitted by the transmitting module 500 can be same as or different from the message displayed by the display module 400.

Similar to the first triggering condition in the above embodiment of the electronic messaging device 001 illustrated in FIG. 2A, the second triggering condition in this embodiment of the electronic messaging device 001 illustrated in FIG. 2B can also be that the electronic messaging device 001 starts, wakes from a sleep mode, or receives a display command, etc., which can be triggered, for example, upon the second person B pressing a function button arranged on the electronic messaging device 001.

In addition, the third triggering condition in this embodiment of the the electronic messaging device 001 illustrated in FIG. 2B can same as or different from the second triggering condition described above. In one example, the third triggering condition is triggered upon the electronic messaging device 001 receiving a "transmit command" transmitted from the second user terminal 300.

In any of the embodiments as illustrated in FIG. 2A and FIG. 2B, each of the receiving module 100 and the transmitting module 500 can optionally comprise a wireless communication module such as an near field communication (NFC) module, a Bluetooth module, or an infrared module, etc., but can optionally comprise a wired communication module such as a USB/microUSB module, a lightning module, etc.

Optionally, the receiving module 100 and the transmitting module 500 can be of a different type. For example, the receiving module 100 comprises an NFC module, whereas the transmitting module 500 comprises a Bluetooth module.

Yet according to some preferred embodiments, the receiving module 100 and the transmitting module 500 as illustrated in FIG. 2A and FIG. 2B can be of a same type, and can be further preferably integrated into a single transceiver 600, as illustrated in FIG. 2C. Herein the transceiver can comprise an NFC transceiver, a Bluetooth transceiver, or an infrared transceiver.

With further reference to the embodiment of the electronic messaging device 001 illustrated in FIG. 2C, the transceiver 600 is configured to receive a message that is left by the first person A and transmitted by the first user terminal 002, and to transmit the message to the second user terminal 003 to thereby reach the second person B, thereby respectively realizing the functionalities of the receiving module 100 and the transmitting module 500 as illustrated in the embodiments illustrated in FIG. 2A and FIG. 2B.

In order to realize a two-way communication between the visitor and the contact person to thereby allow the visitor (i.e. second person B) to forward messages/calls to the contact person (i.e. the first person A/message provider or the third person C) and to allow the contact person to forward messages/calls to the visitor, according to some embodiments, the electronic messaging device 001 further comprises a communications module 700, as illustrated in FIG. 2D.

The communications module 700 is communicatively connected with the processing module 200 of the electronic messaging device 001, and is further communicatively connected with a network 005. In addition, the second user terminal 003 accessible by the second person B, as well as the first user terminal 002 accessible by the first person A, and/or the third user terminal 004 accessible by the third person, are communicatively connected to the network 005.

As such, in the embodiments of the electronic messaging device 001 described herein, the communications module 700 and the network 005 substantially provide message forwarding and/or call forwarding functionality to the electronic messaging device 001, thereby realizing a two-way communication between the second person B (i.e. visitor) and the first person A (i.e. message provider) and/or between the second person B (i.e. visitor) and the third person C.

Herein, the communications module 700 can be connected to the network 005 optionally through a wired connection and more preferably through a wireless connection. In embodiments where a wired connection is implicated, the communications module 700 can optionally comprise a wired communications module such as an internet module, etc. In embodiments where a wireless connection is implicated, the communications module 700 can optionally comprise a wireless communications module such as a WIFI module, a cellular network communications module (e.g. a subscriber identification module (SIM)), etc., and correspondingly, the network 005 can be an internet, an intranet, or a cellular network (i.e. mobile network), etc.

In order to protect the privacies of the second person B, the first person A/third person C, the communications module 700 is optionally configured to hide their identifications during the process of message forwarding and/or call forwarding.

According to some embodiments, during the process of message forwarding, the communications module 700 is configured to hide the identification of each message sender (i.e. the first person A, the second person B, or third person C) completely. Herein, the communications module 700 can furthermore optionally assign different codes (e.g. 001, 002, . . . , etc., or A, B, . . . , etc.) to each message sender.

According to some other embodiments, during message forwarding, the communications module 700 is configured to hide the identification of each message sender partially. In one illustrating example, the telephone number of a message sender can be displayed as 1381234xxxx.

In a manner similar to the above mentioned process of message forwarding, during the process of call forwarding, the communications module 700 is configured to hide the identification of each caller (i.e. the first person A, the second person B, or third person C) partially or completely.

Because the communications module 700 can hide the identification of each message sender and/or each caller when performing message forwarding and/or call forwarding, the communications between the second person B and the first person A/third person C are thus anonymous, which can effectively protect their privacies.

Optionally, the communications module 700 can be further configured to optionally obtain public broadcasting information from the network 005, which can be displayed in the display module 400 or can be transmitted to the relevant party (e.g. the first person A, the second person B, or the third person C).

According to some embodiments of the electronic messaging device 001, the receiving module 100 illustrated in FIG. 2A, FIG. 2B and FIG. 2D, or the transceiver 600 illustrated in FIG. 2C is further configured to receive configuration data from an individual so as to alter a configuration setting of the electronic messaging device 001. Herein the individual can be the first person A (i.e. the message provider) but can also be a different person having the authority to alter the configuration setting of the electronic messaging device 001.

Preferably, the first person A (i.e. the message provider) can, at the same time of leaving a message using the first user terminal 002, also edit a configuration data using the same first user terminal, and the configuration data is further transmitted to the electronic messaging device 001 to thereby alter the configuration setting thereof, such as how the message is displayed in the display module 300.

Figure 3:
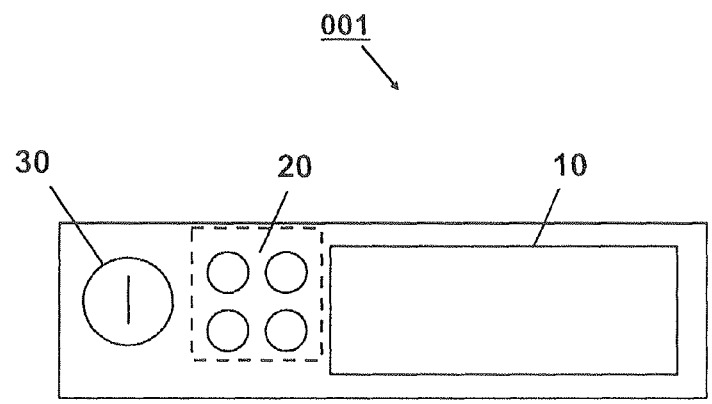
FIG. 3 illustrates a schematic diagram of an electronic messaging device 001 according to a specific embodiment of the disclosure.

It is noted that in addition to the above embodiments where the configuration data altering the configuration setting of the electronic messaging device 001 is received through the receiving module 100, according to some other embodiments, an individual of authority can directly alter the configuration setting of the electronic messaging device 001 through certain function button(s) arranged on the electronic messaging device 001, which will be illustrated in FIG. 3 and described below.

FIG. 3 illustrates a schematic diagram of an electronic messaging device 001 according to a specific embodiment of the disclosure. As shown in the figure, the electronic messaging device 001 comprises a display panel 10, at least one function button 20, and a switch 30.

The display panel 10 is substantially the display module 400 as illustrated in any of the embodiments shown in FIG. 2A, FIG. 2B, and FIG. 2C, and can comprise a low-energy consumption display panel such as a transistor-type of display panel used typically in a calculator, which can be powered by solar cells or a button battery. The switch 30 is configured to control the electronic messaging device 001 to switch between an ON status (wherein the device is turned on) and an OFF status (wherein the device is turned off). It is noted that the switch 300 can be optional, or in other words, the switch 300 may be dispensable in the electronic messaging device 001.

The at least one function button 20 can comprise a display button described above, and a user can press the display button to thereby control the display panel 10 of the electronic messaging device 001 to display the message, or a processed message based thereon, that has been received from the first person A (i.e. message provider) and stored in the electronic messaging device 001.

In addition, the at least one function button 200 can also include other buttons for realizing other functionalities. In one example, the at least one function button 200 can include a button configured to control the electronic messaging device 001 to switch between a SLEEP mode (wherein the device is in the sleep mode) and a WAKE mode (wherein the device is in the wake mode).

It is noted that in any of the embodiments of the electronic messaging device 001 described above, the message that can be displayed by the display module 400 (illustrated in any of FIGS. 2A-2C) or the display panel 10 (illustrated in FIG. 3) can include at least one of a text message, a barcode message, a two-dimensional barcode.

The following lists several illustrating examples of the message that can be displayed by the electronic messaging device 001.

(1) a message consisting of a number string (i.e. pure number-message): such a pure number-message can include a string of pure numbers which can represent a phone number or a barcode. Such a pure number-message has a lowest requirement for the display panel to be displayed, and can be displayed, for example, by a simple and low-energy-consumption display panel such as a transistor-type of display panel.

(2) a message comprising a character string including both texts and numbers (i.e. number and text-mixed message): one example of such a number and text-mixed message is "leaving for about 15 min, please dial 177xxxxxxxx if it is in an urgent condition".

(3) a message consisting of only a code (e.g. barcode or QR code): herein a visitor can scan the code to thereby obtain information associated with the code. This type of message allows a high level of privacy, effectively preventing a risk for exposing the private information of the person leaving the message.

(4) a message comprising both a code and a number string (i.e. code and number-mixed message): Herein, a visitor can, scan the code to thereby obtain information associated therewith, or if it is inconvenient for the visitor to scan the code, the visitor can alternatively dial the phone number shown in the number string to thereby reach the person associated with the number.

(5) a message consisting only of a prompt (but no message): in one example, the prompt can be "please use a phone with an NFC functionality to read the message".

Please be noted that the above five examples serve only as illustrating purposes, and do not impose any limitation to the scope of the message that can be used in the method disclosed herein, and the message to be displayed by the display panel can be of other types and can have different combinations of these different types.

In a second aspect, the present disclosure further provides an electronic messaging method that utilizes the electronic messaging device 001 as described above.

Figure 4:
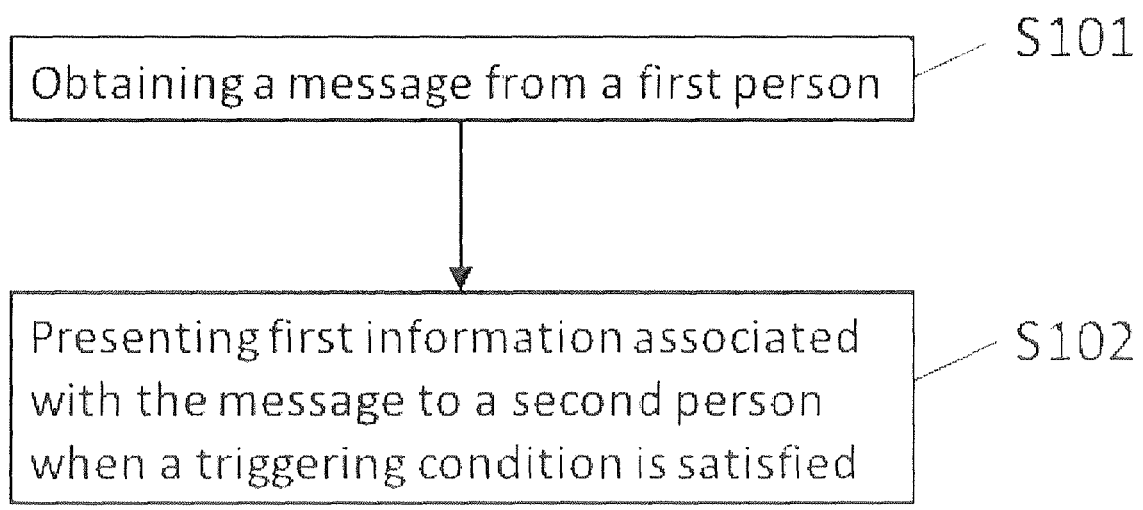
FIG. 4 illustrates a flow chart of an electronic messaging method according to some embodiments of the disclosure.

With reference to FIG. 4, the electronic messaging method according to some embodiments of the disclosure comprises the following steps:

S101: obtaining a message from a first person; and
S102: presenting first information associated with the message to a second person when a first triggering condition is satisfied.

Herein, the step S101 of obtaining a message from a first person can be realized through a first user terminal 002 that is communicatively connected with the electronic messaging device 001. Specifically, the first person can leave a message using the first user terminal 002, and the message is then transmitted from the first user terminal 002 to the electronic messaging device 001 for storage, processing, or other actions.

Transmission of the message from the first user terminal 002 to the electronic messaging device 001 can be realized via the receiving module 100 or the transceiver 600 of the electronic messaging device 001 described above and illustrated in FIGS. 2A-2C, in a wired manner or more preferably in a wireless manner (e.g. NFC).

Figure 5:
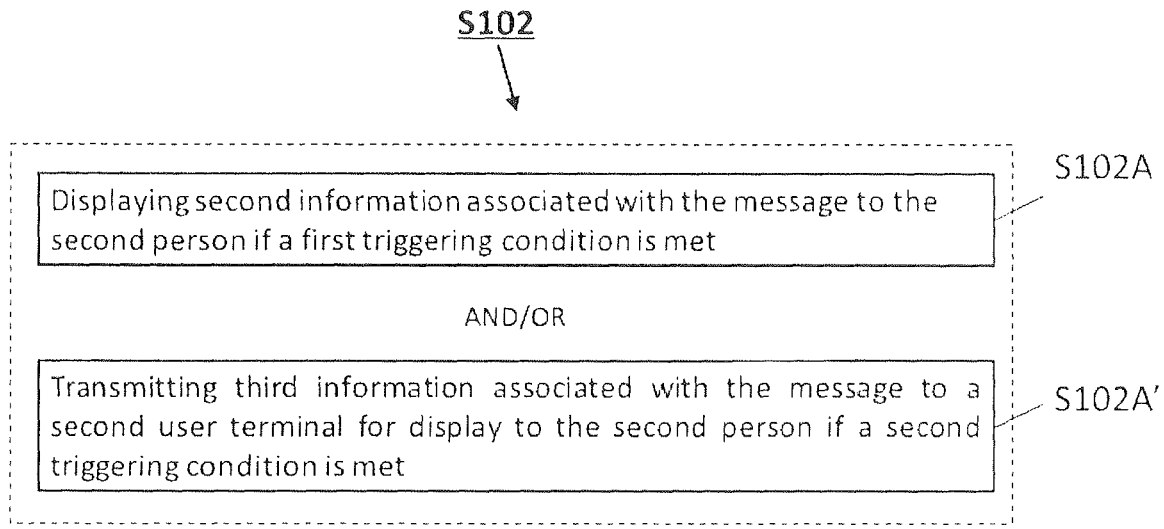
FIG. 5 illustrates an embodiment of the step S102 of the electronic messaging method shown in FIG. 4.

As shown in FIG. 5, the step S102 can specifically comprise at least one of the following sub-steps:

S102A: displaying second information associated with the message to the second person if a second triggering condition is met; or S102A': transmitting third information associated with the message to a second user terminal for display to the second person if a third triggering condition is met.

Herein the second information to be displayed in the sub-step S102A and the third information to be transmitted in the sub-step S102A' can be regarded as part, or all, of the first information to be presented in the step S102.

Herein the sub-step S102A of displaying second information associated with the message to the second person can be realized by the display module 400 of the electronic messaging device 001. The second triggering condition can be that the electronic messaging device 001 starts, or can be that the electronic messaging device 001 wakes from a sleep mode (e.g. upon pressing of a WAKE button by the second person), or can be that the electronic messaging device 001 receives a display command (e.g. upon pressing of a DISPLAY button by the second person), etc.

Furthermore, the first information can be a whole or part, of the message (e.g. a phone number of a contact person), can be a processed message (e.g. a barcode, a QR code associated with the message), or can be merely a pre-stored prompt (e.g. "please use a phone with an NFC functionality to read the message").

Herein in the sub-step S102A' of transmitting third information associated with the message to a second user terminal for display to the second person, the second information can be similarly a whole or part, of the message, or can be a processed message (e.g. a barcode, a QR code associated with the message).

In addition, transmission of the third information associated with the message from the electronic messaging device 001 to the second user terminal 003 can be realized via the transmitting module 500 (as illustrated in FIGS. 2A-2B) or the transceiver 600 (as illustrated in FIG. 2C) of the electronic messaging device 001 described above, in a wired manner or more preferably in a wireless manner (e.g. NFC).

In the embodiments of the electronic messaging method where the step S102 comprises the sub-step S102A', the second information to be transmitted to the second person (i.e. the visitor) can be based on a class to which the visitor belongs, which can be determined based on an identification of the visitor captured by the electronic messaging device. As such, a visitor-specific push of the message can be realized. In addition, the communication of messages can be relatively more efficient and more accurate, allowing different visitors to obtain different contents of the message that may be of more preference to the visitors. Additionally, the number of communications can also be reduced.

Herein optionally the different classes can regard different ranks (e.g. general or VIP, etc.). If it is determined, based on the identification of a visitor, that the visitor is a general visitor, only a general content of the message is pushed to the visitor. If, however, it is determined that the visitor is a VIP visitor, a VIP content of the message can be pushed to the visitor. Herein the VIP content of the message can, for example, include a content that is exclusive to the VIP visitor in addition to the general content.

Herein the different classes can regard different regions as determined by the different phone numbers (i.e. the different identifications) of the visitor. Thus based on the phone number of the visitor, the region corresponding to the phone number can be determined, and subsequently, a content of the message corresponding to the region can be specifically pushed to the visitor.

Figure 6:
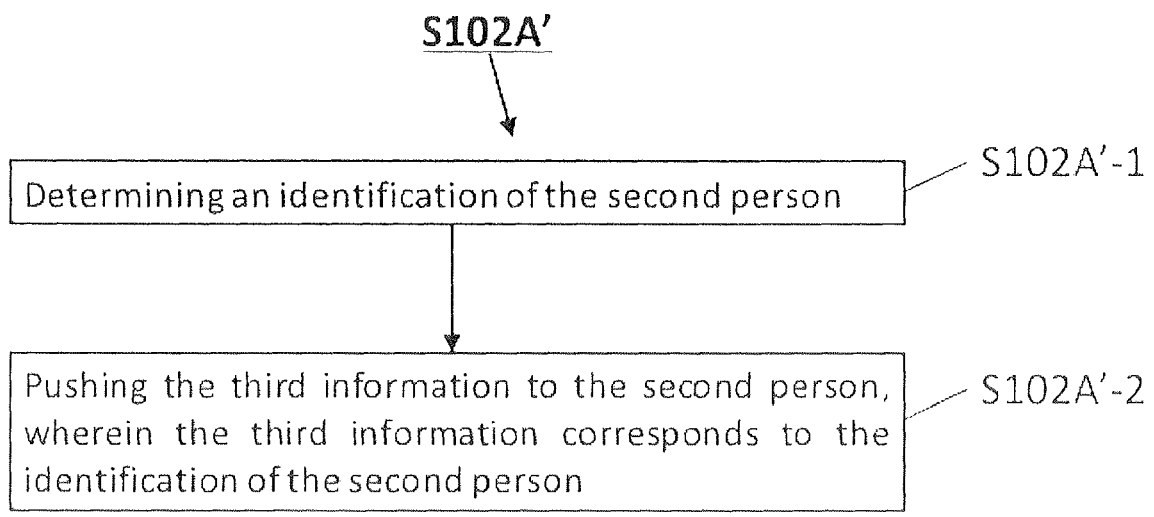
FIG. 6 illustrates a flow chart of the sub-step S102A' in the step S102 of the electronic messaging method shown in FIG. 5.

The sub-step S102A' can thus include the following sub-steps, as illustrated in FIG. 6:

S102A'-1: Determining an identification of the second person; and

S102A'-2: Pushing the third information to the second person, wherein the third information corresponds to the identification of the second person.

Herein in the sub-step 102A'-1, the identification of the second person (i.e. the visitor) can be determined optionally by an identification recognition module (not shown in the drawings) arranged on the electronic messaging device, which can be a fingerprint recognition module, a facial recognition module, or a password inputted by the visitor.

Optionally, the identification of the second person (i.e. the visitor) can be determined the physical address of the second user terminal (e.g. a MAC address), or the phone number associated with the second user terminal, or the information provided by the visitor.

It is noted that the visitor-specific presenting of the message to the second person is not limited to the sub-step S102A'-2 described above, the embodiments of the electronic messaging method where the step S102 comprises the sub-step S102A of directly displaying the second information to the second person can also realize a visitor identification-dependent presentation of the information. This can similarly be realized by means of the information identification recognition module arranged on the electronic messaging device.

Figure 7:
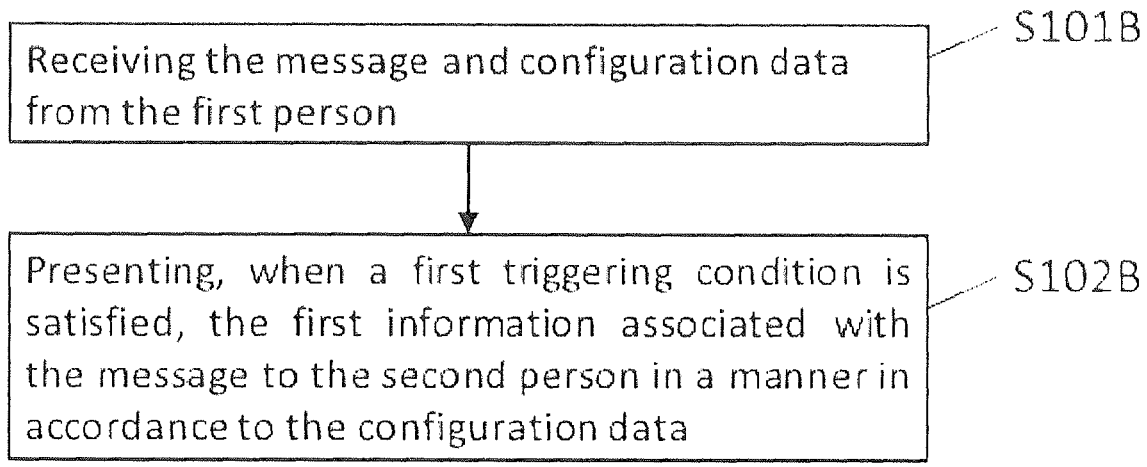
FIG. 7 illustrates an embodiment of the step S101 of the electronic messaging method shown in FIG. 4.

According to some embodiments of the electronic messaging method as illustrated in FIG. 7, the step S101 can comprise:

S101B: Receiving the message and configuration data from the first person.

Accordingly, the step S102 can comprise:

S102B: presenting, when a first triggering condition is satisfied, the first information associated with the message to the second person in a manner in accordance to the configuration data.

As such, by means of the above mentioned messaging method, the first person A can also send configuration data to the electronic messaging device 001 at the same time of leaving a message to the electronic messaging device 001. Then the electronic messaging device 001 can further present the information associated with the message (i.e. by directly displaying via the display module 400 or by transmission to the second user terminal 003 for display) to the second person B in a manner that is specified by the configuration data.

For example, when leaving a message, the first person A can also specify what information can be displayed and in what format through the display module 400, and/or what information can be transmitted to the second user terminal 300 for display in the configuration data. Then based on the message and the configuration data received, the electronic messaging device 001 can, upon triggered (i.e. the triggering condition is satisfied), correspondingly present the information associated with the message to the second person B in a manner in accordance to the configuration data.

Figure 8:
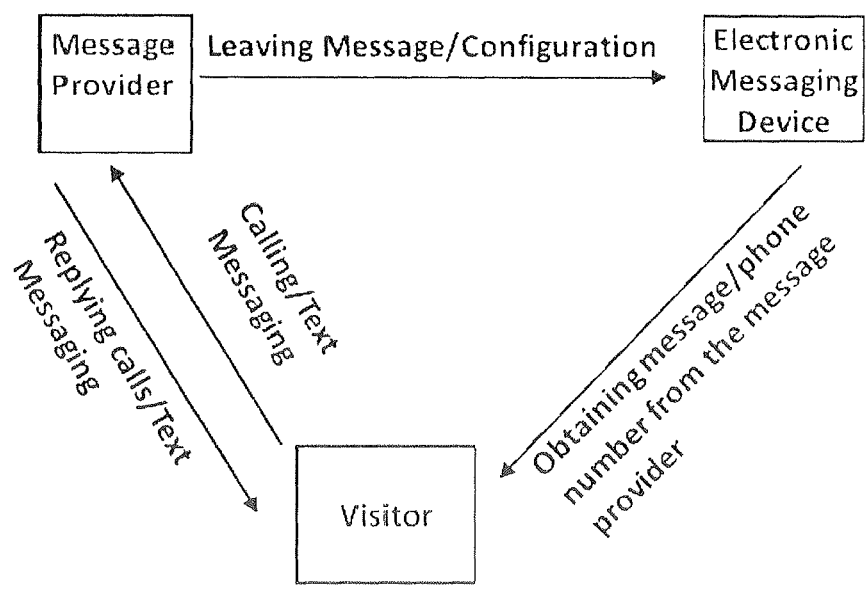
FIG. 8 illustrates one specific example where a visitor can check a message left by a message provider by means of the electronic messaging device illustrated in FIG. 3.

FIG. 8 illustrates one specific example where a visitor can check a message left by a message provider by means of the aforementioned electronic messaging device illustrated in FIG. 3 using the electronic messaging method described above.

As specifically illustrated, the message provider (i.e. the first person A illustrated in FIGS. 1A-1B, and 2A-2D) can leave a message and specify configuration data to the electronic messaging device, which can be performed through a user terminal (e.g. a smart phone) communicatively coupled with the electronic messaging device (such as an NFC connection with the NFC module in the electronic messaging device). Then the electronic messaging device can store, and optionally process, the message and the configuration data.

If a visitor (i.e. the second person B illustrated in FIGS. 1A-1B, and 2A-2D) approaches the electronic messaging device to check the message stored therein, the electronic messaging device can display the message to the visitor when the visitor press a DISPLAY button arranged on the electronic messaging device (i.e. the triggering condition). In this specific example, a display panel of the electronic messaging device (i.e. the display module illustrated in FIGS. 2A-2D) can display information associated with the message, including a text of the message and a phone number of the message provider, to the visitor.

After obtaining the information associated with the message, the visitor can further contact directly with the message provider by text messaging and phone calling, and the message provider can further reply the phone call or text messages from the visitor, both through a cellular network.

In the above example, rather than directly displaying the message, the display panel of the electronic messaging device can alternatively display only a QR code upon triggering, and the visitor can then use a user terminal (e.g. a smart phone) to scan the QR code to subsequently obtain the information associated with the message.

Figure 9:
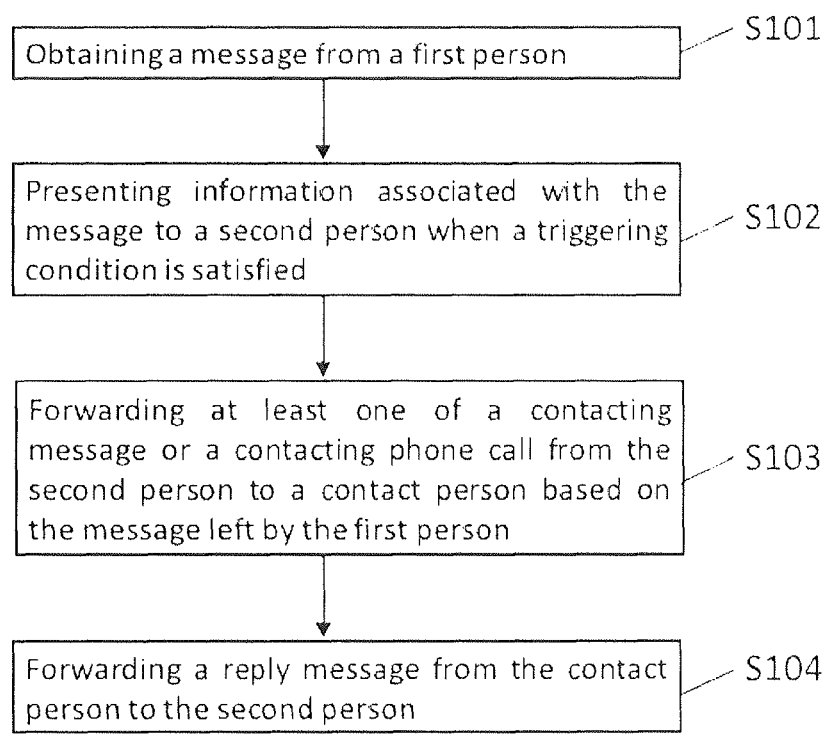
FIG. 9 illustrates a flow chart of an electronic messaging method according to some embodiments of the disclosure.

In order to confer the electronic messaging device with such a functionality, according to some embodiments of the disclosure illustrated in FIG. 9, after step S102, the electronic messaging method further comprises:

S103: forwarding at least one of a contacting message or a contacting phone call from the second person to a contact person based on the message left by the first person.

Herein, the step S103 can be realized through the communications module 700 of the electronic messaging device as illustrated in FIG. 2D. The communications module 700 is communicatively coupled to a network 005 which is further coupled with a user terminal for the contact person, who can be the message provide (i.e. the first person A) or a different person (i.e. the third person C). As such, it substantially realizes a message forwarding and/or call forwarding capability for the electronic messaging device.

According to some embodiments, in the step S103, at the same time of forwarding the contacting message and/or contacting phone call from the second person B (i.e. visitor) to the contact person, an identification of the visitor is also forwarded. With the inclusion of the identification of the visitor, it is possible for the electronic messaging device to forward the message/call from more than one visitor, which can be differentiated through their different identifications.

In order to protect the privacy of the second person, the identification of the second person can optionally be hidden completely or partially (e.g. shown as "135xxxxxxxx"), and each visitor can be assigned with a different code (e.g. 001, 002, . . . etc.).

Optionally, after step S103, the electronic messaging method further comprises:

S104: forwarding a reply message from the contact person to the second person.

S104 occurs optionally when the contact person (the first person A/message provider or the third person C) wants to send a reply message to the second person B/visitor, and the replying message can be forwarded by the electronic messaging device (or more specifically by the communications module 700 illustrated in FIG. 2D.

Optionally, if the contact person wants to call back, the answering phone call can reach the visitor via the network 005 (e.g. the cellular network) as also illustrated in FIG. 2D.

Similar to the step S103, during the process of forwarding the reply message from the contact person, the identification of the contact person can also be forwarded, which can also be hidden completely or partially in order to provide a privacy protection. With the inclusion of the identification of the contact person, it is possible for the electronic messaging device to forward the message/call from more than one contact person, which can be differentiated through their different identifications.

Figure 10:
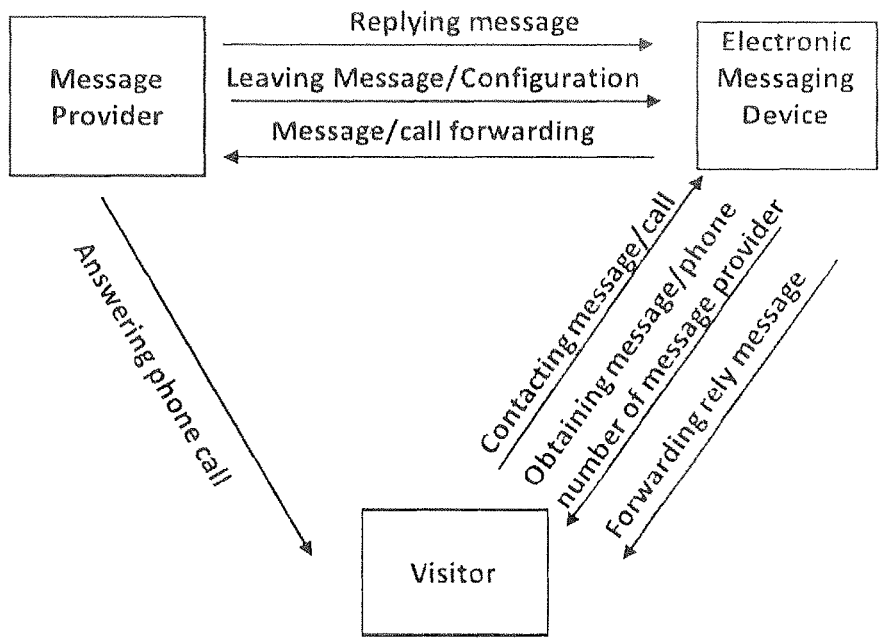
FIG. 10 illustrates a specific example where the electronic messaging device forwards contacting messages and contacting phone calls between the visitor and the message provider.

FIG. 10 illustrates a specific example where the electronic messaging device can also forward contacting messages and contacting phone calls between a visitor and a contact person in addition to displaying the message left by a message provider. In the example, the contact person is the message provider.

Similar to the example shown in FIG. 8, the message provider in this specific example shown in FIG. 10 can leave a message and specify configuration data to the electronic messaging device, then the electronic messaging device can store, and optionally process, the message and the configuration data.

If a visitor approaches the electronic messaging device to check the message stored therein, the electronic messaging device can, when triggered, present first information associated with the message (e.g. a text of the message and a phone number of the message provider) to the visitor (including directly display second information associated with the message to the visitor, and/or transmit the third information associated with the message to a user terminal for display to the visitor).

Then based on the information associated with the message, the visitor can further sending contacting messages and/or contacting phone calls to the electronic messaging device. The electronic messaging device can further forward these contacting messages and/or contacting phone calls to the message provider.

If the message provider replies with reply messages, the reply messages can reach the visitor, also by means of the electronic messaging device. In addition, the message provider can also answer phone calls directly to the visitor.

As such, through the electronic messaging method that utilizes the electronic messaging device described above and illustrated above, it substantially realizes a two-way communication between the visitor and the message provider, thus the issue associated with the traditional messaging method that the message can only be transmitted in only one way (i.e. from the message provider to the visitor) can be effectively solved.

Figure 11:
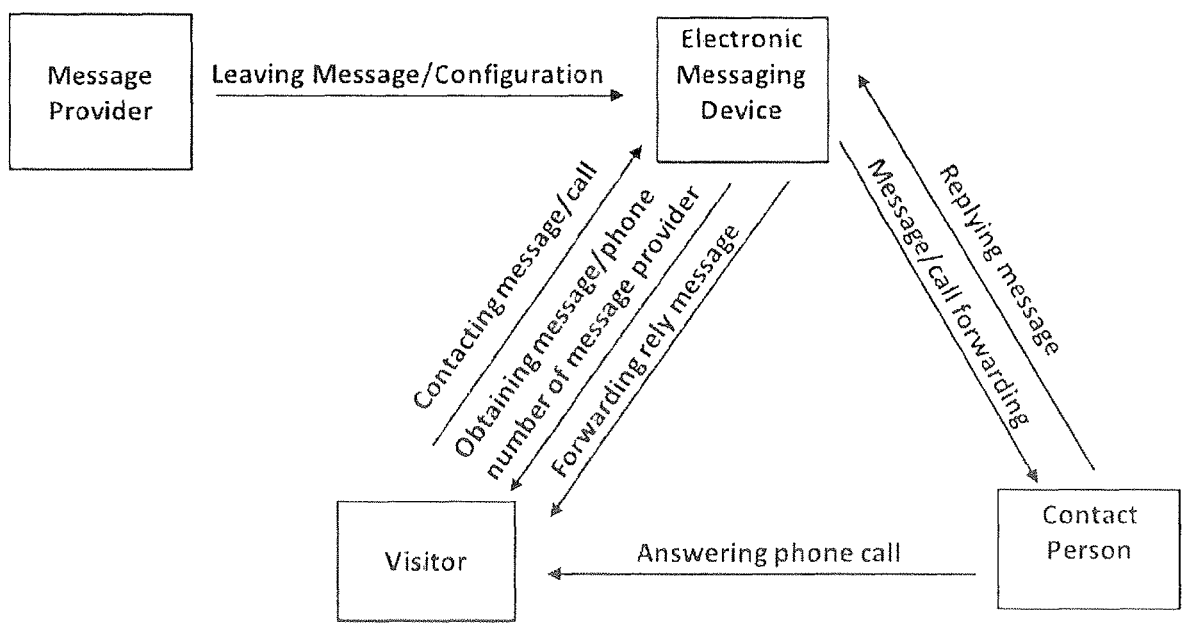
FIG. 11 illustrates another specific example where the electronic messaging device forwards contacting messages and contacting phone calls between the visitor and a contact person other than the message provider.

It is noted that in addition to the above example where the message provider is the contact person, the contact person can be a different person other than the message provider, and a specific example reflecting this above situation is illustrated in FIG. 11. In this example, the electronic messaging device can forward contacting messages and contacting phone calls between the visitor and a contact person other than the message provider.

In a manner similar to the above two examples illustrated in FIG. 8 and FIG. 10, the message provider in this specific example shown in FIG. 11 also leaves a message and specifies configuration data to the electronic messaging device, then the electronic messaging device can store, and optionally process, the message and the configuration data.

When the visitor approaches the electronic messaging device to check the message stored therein, the electronic messaging device can, when triggered, similarly present first information associated with the message (e.g. a text of the message and a phone number of the message provider) to the visitor (including directly display second information associated with the message to the visitor, and/or transmit the third information associated with the message to a user terminal for display to the visitor).

Then based on the first information received, the visitor can further sending contacting messages and/or contacting phone calls to the electronic messaging device, which further forwards these contacting messages and/or contacting phone calls to the contact person.

If the contact person replies with reply messages, the reply messages can be forwarded to the visitor by means of the electronic messaging device. In addition, the contact person can also answer phone calls directly to the visitor.

As such, through the electronic messaging method that utilizes the electronic messaging device described above and illustrated above, it substantially realizes a two-way communication between the visitor and the contact person.

In a third aspect, the present disclosure further provides an electronic messaging system, which has the electronic messaging device according to any of the embodiments as described above.

According to some embodiments with reference to FIG. 1A and FIG. 1B, the electronic messaging system can include, in addition to the electronic messaging device, a first user terminal communicatively connected to the electronic messaging device. The first user terminal is configured to allow the first person to leave a message thereby and further to transmit the message to the electronic messaging device for presenting the message to the second person (i.e. visitor). The electronic messaging system is substantially illustrated in FIG. 1A and FIG. 1B.

According to some embodiments with also reference to FIG. 1A and FIG. 1B, the electronic messaging system can include, in addition to the electronic messaging device, a second user terminal communicatively connected to the electronic messaging device. The second user terminal is configured to obtain information associated with the message left by the first person (i.e. message provider) to thereby display to the second person (i.e. visitor). The electronic messaging system is substantially illustrated in.

According to yet some embodiments with reference to FIG. 1B, the electronic messaging system can include, in addition to the electronic messaging device, a third user terminal communicatively connected to the electronic messaging device. The third user terminal is configured to allow a contact person other than the first person (i.e. message provider) to receive messages/calls that are sent from the second person (i.e. visitor) and forwarded by the electronic messaging device.

Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. An electronic messaging device for presenting a message to a subject, comprising:
   a receiving module;
   a processing module; and
   a display module and a transmitting module;
   wherein:
   the receiving module is configured to receive the message, and then to send the message to the processing module;
   the processing module is configured, upon detection that a first triggering condition is satisfied, to send first information associated with the message to the display module or the transmitting module for presentation to the subject; wherein, the processing module is configured, upon detection that a second triggering condition is satisfied, the second triggering condition being that the electronic messaging device starts, wakes up from a sleep mode, or receives a display command, to send second information associated with the message to the display module for display to the subject;
   the electronic messaging device further comprises an identification recognition module configured to obtain an identification of the subject;
   the first information presented to the subject comprises information specific to the subject based on the identification of the subject;
      in a case that the identification of the subject corresponds to a general visitor, the first information presented to the subject is general content for the general visitor;
      in a case that the identification of the subject corresponds to a VIP visitor, the first information presented to the subject is VIP content for the VIP visitor;
      each visitor is assigned a different code based on a physical address of a user terminal, a phone number associated with the user terminal, or information provided by the subject;
      the identification of the subject is hidden completely or partially to protect privacy of the each visitor;
      'the receiving module and the transmitting module are integrated into a transceiver configured to work in an NFC manner, a Bluetooth manner, or an infrared manner to thereby realize an electronic message board function for the subject.

2. The electronic messaging device of claim 1, further comprising a communications module, communicatively connected to a network and configured to forward either or both of a contacting message or a contacting phone call from the subject to another subject implicated in the message through the network, wherein the communications module is configured to hide the identification of the subjects in the messages.

3. The electronic messaging device of claim 2, wherein the communications module is further configured to forward a reply message from the another subject to the subject.

4. The electronic messaging device of claim 2, wherein the communications module comprises at least one of a WIFI module, a cellular network communications module, or an Ethernet module.

5. The electronic messaging device of claim 1, comprising a transmitting module, wherein the processing module is configured, upon detection that a third triggering condition is satisfied, to send third information associated with the message to the transmitting module for pushing to the subject.

6. The electronic messaging device of claim 1, wherein the transceiver is configured to work in an NFC manner.

7. The electronic messaging device of claim 1, wherein:
   the receiving module is further configured to receive configuration data, and then to send the configuration data to the processing module; and
   the at least one of the display module and the transmitting module is configured to present the first information in a manner in accordance to the configuration data.

8. An electronic messaging method utilizing an electronic messaging device according to claim 1, the electronic messaging method comprising:
   obtaining the message; and
   presenting the first information associated with the message to a subject when the first triggering condition is satisfied.

9. The electronic messaging method according to claim 8, further comprising:
   forwarding at least one of a contacting message or a contacting phone call from the subject to another subject based on the message.

10. The electronic messaging method according to claim 9, further comprising:
    forwarding a reply message from the another subject to the subject.

11. The electronic messaging method according to claim 8, wherein the presenting the first information associated with the message to a subject when the first triggering condition is satisfied comprises at least one of:
    displaying second information associated with the message to the subject if a second triggering condition is met; or
    transmitting third information associated with the message to the subject if a third triggering condition is met.

12. The electronic messaging method according to claim 8, wherein the obtaining the message comprises:
    receiving the message and configuration data;
    wherein:
       the presenting the first information associated with the message to a subject when the first triggering condition is satisfied comprises:
          presenting the first information to the subject in a manner in accordance to the configuration data.

13. The electronic messaging method according to claim 8, further comprising, prior to the presenting the first information associated with the message to a subject when a triggering condition is satisfied:
    determining an identification of the subject;
    wherein:
       in the presenting the first information associated with the message to a subject when the first triggering condition is satisfied:

the information corresponds to the identification of the subject.

14. An electronic messaging system, comprising an electronic messaging device according to claim 1.

15. The electronic messaging system of claim 14, further comprising a first user terminal, communicatively connected to the electronic messaging device and configured to allow a user to leave a message thereby and further to transmit the message to the electronic messaging device.

16. The electronic messaging system of claim 14, further comprising a second user terminal, communicatively connected to the electronic messaging device and configured to receive from the electronic messaging device, and then to present to a subject, information associated with the message.

* * * * *